United States Patent
Inauen (10) Patent No.: US 11,605,835 B2
(45) Date of Patent: Mar. 14, 2023

(54) BATTERY WITH A PRECISELY POSITIONED CONSTRUCTION

(71) Applicant: SWISSBATT AG, Appenzell Steinegg (CH)

(72) Inventor: Marcel Inauen, Appenzell (CH)

(73) Assignee: SWISSBATT AG, Appenzell Steinegg (CH)

( * ) Notice: Subject to any disclaimer, the term of this patent is extended or adjusted under 35 U.S.C. 154(b) by 310 days.

(21) Appl. No.: 16/222,762

(22) Filed: Dec. 17, 2018

(65) Prior Publication Data

US 2019/0123375 A1    Apr. 25, 2019

Related U.S. Application Data

(63) Continuation of application No. 13/925,208, filed on Jun. 24, 2013, now abandoned.

(30) Foreign Application Priority Data

Sep. 11, 2012 (EP) ..................................... 12405094

(51) Int. Cl.
 *H01M 10/00* (2006.01)
 *H01M 10/0585* (2010.01)
 (Continued)

(52) U.S. Cl.
 CPC ... *H01M 10/0585* (2013.01); *H01M 10/0436* (2013.01); *H01M 10/0525* (2013.01);
 (Continued)

(58) Field of Classification Search
 CPC ...... H01M 2/18; H01M 2/026; H01M 2/0277; H01M 10/04; H01M 10/0436;
 (Continued)

(56) References Cited

U.S. PATENT DOCUMENTS 7,842,423 B2 * 11/2010 Kowalczyk ............. H01M 4/06
                                                         429/185
7,901,808 B2    3/2011 Morgan et al.
(Continued)

FOREIGN PATENT DOCUMENTS

EP    0854529 A1    7/1998
EP    1100139 A1    5/2001
(Continued)

OTHER PUBLICATIONS

Celgard product literature May 17, 2012 (http://www.jobike.it/Public/data/Daniele%20Consolini/2012517114032_Celgard_Product_Comparison_10002.pdf).*
(Continued)

*Primary Examiner* — Cynthia H Kelly
*Assistant Examiner* — Monique M Wills
(74) *Attorney, Agent, or Firm* — Birch, Stewart, Kolasch & Birch, LLP (57) ABSTRACT

A battery comprises at least one layer with anode material. For each layer with anode material, the battery comprises at least one layer with cathode material. Between each layer with anode material and each layer with cathode material there lies at least one separator as a separating layer. The battery also comprises a housing with an interior space. The housing is arranged such that it surrounds the layers, in each case such that each layer with anode material and each layer with cathode material is completely accommodated in it. The housing is substantially of a material that has no, or negligible, electrical conductivity. The housing is preferably of a nonconductor, with preference of plastic. The invention also relates to a method for producing the battery according to the invention, and to a use of the same.

14 Claims, 7 Drawing Sheets

(51) Int. Cl.
*H01M 10/04* (2006.01)
*H01M 10/0525* (2010.01)
*H01M 10/42* (2006.01)
*H01M 50/116* (2021.01)
*H01M 50/463* (2021.01)

(52) U.S. Cl.
CPC ..... *H01M 10/4235* (2013.01); *H01M 50/116* (2021.01); *H01M 50/463* (2021.01); *Y10T 29/49108* (2015.01)

(58) Field of Classification Search
CPC ......... H01M 10/0585; H01M 10/4235; H01M 10/0525; H01M 50/463; Y01T 29/49108; Y02E 60/122; Y10T 29/49108
See application file for complete search history.

(56) References Cited

U.S. PATENT DOCUMENTS

| | | | | |
|---|---|---|---|---|
| 2004/0127952 | A1* | 7/2004 | O'Phelan | H01M 6/005 607/36 |
| 2005/0041366 | A1* | 2/2005 | Breven | H01G 9/008 361/302 |
| 2005/0084753 | A1* | 4/2005 | Kim | H01M 50/116 429/186 |
| 2005/0245983 | A1 | 11/2005 | Kast et al. | |
| 2005/0271933 | A1 | 12/2005 | Matsumoto et al. | |
| 2006/0035152 | A1* | 2/2006 | Nishimura | H01M 50/10 429/234 |
| 2008/0274394 | A1* | 11/2008 | Schormann | H01M 10/0436 429/50 |
| 2008/0299451 | A1 | 12/2008 | Funahashi et al. | |
| 2008/0305398 | A1 | 12/2008 | Komiya | |
| 2009/0136831 | A1 | 5/2009 | Wyser | |
| 2011/0250485 | A1 | 10/2011 | Tsukuda | |
| 2012/0100406 | A1 | 4/2012 | Gaugler | |

FOREIGN PATENT DOCUMENTS

| | | |
|---|---|---|
| EP | 2065952 A1 | 6/2009 |
| EP | 2458669 A2 | 5/2012 |

OTHER PUBLICATIONS

European Seach Report for European Patent No. 16153639.6, dated May 18, 2016.

Laird ed, Slightly entry, Websters New World Thesaurus, 3rd ed, Pocket Books, NY, Jul. 2003, p. 408.

Yoshio et al. (ed), "Lithium-ion batteries," Springer, New York, 2009, p. 378, table 20.

* cited by examiner

BATTERY WITH A PRECISELY POSITIONED CONSTRUCTION

This application is a Continuation of copending application Ser. No. 13/925,208, filed on Jun. 24, 2013, which claims priority under 35 U.S.C. § 119(a) to application Ser. No. 12/405,094.9, filed in Europe on Sep. 11, 2012, all of which are hereby expressly incorporated by reference into the present application.

TECHNICAL FIELD

The invention relates to batteries with a precisely positioned construction, and to the use and production thereof. The invention relates in particular to batteries with precisely positioned anode and cathode material of a stacked construction, the production and use thereof according to the preambles of the independent claims.

PRIOR ART

A battery is an electrochemical energy storage device and an energy converter. During the discharge, stored chemical energy is converted into electrical energy. This can be used by an electrical end device that is independent of the power grid. A particular challenge in respect of the size, safety and performance of a battery is presented by the task of supplying electrical power to medical devices that are partially or entirely implanted, such as for example pacemakers, hearing aids, insulin pumps and medicament dispensers. There is also a demand for ever smaller batteries with undiminished power and running time for entertainment devices in daily use.

A decisive factor for batteries of compact forms is that, in spite of the compact form, they offer immunity from short-circuits, i.e. from the physical, voltage-discharging connection between the two poles of a cell, and nevertheless have an energy density that is as high as possible in a very small space. EP 1 100 139 A1 (WYON A G, Appenzell, C H) describes a battery with a high energy density of the lithium-ion or lithium-polymer type. A wound battery is shown, the active band length of the cathode and anode being as great as possible. For this purpose, a discharge region in the form of a pin is enclosed by a winding of the discharge band.

US 2012/0100406 A1 (VARTA MICROBATTERY GMBH, Ellwangen, D E) shows a button cell with a wound electrode. Such button cells may be based for example on a zinc/manganese, nickel/cadmium or lithium-ion electrode. Two housing halves of metal thereby enclose an arrangement comprising a positive electrode, a negative electrode and a separator arranged in between.

U.S. Pat. No. 7,901,808 B2 (CARDIAC PACEMAKERS, INC., St. Paul, US-MN) shows a battery of a stacked construction with successive electrode layers. Two separator layers per electrode layer enclose them like a sandwich. The outer periphery of the separators is completely welded, apart from an aperture for the discharge tabs.

All of these batteries have the common problem that they have to combat the challenges presented by miniaturization with a relative loss of capacity in order to prevent a short-circuit. In particular, the formation of dendrites at the lateral ends of the electrodes may compromise the electrical separation of the poles. Generally, separators, porous or microporous membranes or layers impregnated with an electrolyte, prevent contact between the opposing electrodes. These can, however, be damaged or displaced by knocks, shocks or movements, as a result of which they no longer perform their function, or only insufficiently. Metallic housing walls may in this case be conducive to the flow of ions and also contribute indirectly to dentrite formation and encourage a short-circuit between the cathode and the anode or between the carrier band of the cathode and the housing. In order to preclude such difficulties, many batteries keep a safety distance S between a housing wall and an electrode. In practice, a safety distance of more than 0.5 mm is maintained. Furthermore, a further safety distance T of more than 0.5 mm is additionally allowed for in the area extent of an electrode layer for the positioning of the cathode with respect to the anode. Altogether, this produces a total loss of potentially active electrode area of 1 mm or more in the overall extent of the electrode layer. For miniaturized, i.e. size-critical, batteries in particular, the loss of capacity resulting from this cumulative safety distance T and S is of great significance. The cathode areas, and accordingly the capacity, are reduced disproportionately in comparison with the overall dimensions of the battery.

SUMMARY OF THE INVENTION

It is an object of the present invention to provide a battery that is classified within the technical field mentioned at the beginning and minimizes as much as possible the loss of capacity caused by the required safety distances. The solution by which the object(s) is/are achieved is defined by the characterizing features of the independent claims. One aspect of the present invention concerns a battery, in particular a battery of a stacked construction. The battery according to the invention comprises at least one layer with anode material. For each at least one layer with anode material, the battery comprises at least one layer with cathode material. Between each at least one layer with anode material and each at least one layer with cathode material there lies at least one separator as a separating layer. The battery according to the invention also comprises a housing with an interior space. The housing is arranged such that it surrounds the layers, in each case such that each at least one layer with anode material and each at least one layer with cathode material is completely accommodated in it. The housing is substantially of a material that has no, or negligible, electrical conductivity. The housing is preferably of a nonconductor, with preference of plastic.

In the particular embodiment of the stacked construction, the layers with anode material, or cathode material, and the separating layers may be laid one after the other into a stacked construction.

Anode material should be understood according to the invention as meaning electrode material that acts as an electron acceptor, while cathode material should be understood according to the invention as meaning electrode material that acts as an electron donor. This definition is intended to apply to the operation of the battery and not to a possible recharging process that may apply to rechargeable batteries, i.e., during the discharging process of the battery, the cathode material is the positive electrode.

For the purposes of the present invention, no, or negligible, electrical conductivity should be understood as meaning a conductivity of less than $10^{-6}$ S/m, in particular the conductivity of a material or material mixture known as nonconductors or as insulators. In particular, most nonmetals, as well as hydrocarbon compounds and many organic compounds are considered to be such nonconductors. In a preferred embodiment, no, or negligible, electrical conductivity according to the present invention is a conductivity of less than 10'S/m. Accordingly, according to the present invention, a nonconductor should be a material that has no, or almost insignificant, electrical conductivity, preferably less than 10" S/m.

According to the present invention, a separator performs the function of a spatial, i.e. in particular physical, and electrical separating layer between two electrode layers, a layer with anode material and a layer with cathode material. In this case, a separator should be permeable to ions. In its simplest embodiment, the separator comprises a porous material that is impregnated in an electrolyte solution. Suitable, inter alia, are microporous plastics, nonwovens, glass fibers, polyethylene, etc.

The solution according to the invention allows a first safety distance S, between the housing inner wall and a side edge of the electrode, and a second safety distance T, between the side edge of the electrode and the side edge of the counterelectrode, to be chosen smaller. In this way, a disproportionately occurring loss of capacity due to the reduction in size of the battery can be prevented. Altogether, it is possible to produce a battery that is more efficient in its dimensions.

The form of the battery may be a button form, a horseshoe form, a cuboid, etc. Particularly in the case of stacked batteries of a horseshoe form, the outer edge of the electrode areas is particularly large and a correspondingly high loss of capacity is caused as a result of the required safety distances S and T. A restriction of said safety distances is accordingly particularly advantageous for batteries of a horseshoe form.

In a particular embodiment, the at least one layer with cathode material comprises a cathode coated on a metallic carrier band and the at least one layer with anode material comprises an anode coated on a metallic carrier band.

In a particular embodiment, the separator protrudes in surface area beyond the at least one layer with cathode material. As a result, the part of the separator that protrudes in surface area beyond the at least one layer with cathode material forms at least one overhang. This overhang protrudes beyond at least one edge of the at least one layer with cathode material. It expediently protrudes beyond a narrow edge of a substantially sheet-like layer. In this embodiment, the overhang of this separator is connected to a further overhang of the same separator or a further overhang of a further separator by way of a plurality of integral connecting locations. For example, in a sandwich construction, a first layer with cathode material may lie on a first separator as a separating layer, which protrudes in surface area beyond the first layer with cathode material. The portion of the separator that protrudes in surface area beyond the first layer with cathode material forms a first overhang. In an analogous way, a second separator, which lies on the first layer with cathode material, forms a second overhang by the portion by which the second separator protrudes in surface area beyond the first layer with cathode material. In this example, the first overhang would be connected to the second overhang by way of a plurality of integral connecting locations. This consequently allows, inter alia, the layers to be positioned particularly precisely. Safety is increased and a better capacity can be achieved, in that the safety distances T and S can be reduced.

In a particular embodiment, the plurality of integral connecting locations are welding points, in particular welding seams.

In a particular embodiment, not the entire overhang is integrally connected to a further overhang, but merely a plurality of individual connecting points, in particular welding points.

In a particular embodiment, the arrangement is repeated for each further layer with cathode material, i.e. each layer with cathode material is enclosed by two separators connected to one another by way of a plurality of integral connecting locations. In a further particular embodiment, a layer with cathode material is enclosed by a separator which is folded around a narrow edge of the layer with cathode material in such a way that it protrudes beyond the enclosing layer on both sides by an overhang. These two overhangs are connected to one another by way of a variety of integral connecting locations.

In a particular embodiment, the separator has a clearance on one side, in order to allow a discharge tab to be led through from the active electrode layer.

In a particular embodiment, the battery comprises at least two layers with at least one separator as a separating layer between the two layers. The at least two layers and the at least one separator as a separating layer are positively engaging and designed such that no shearing movement is possible between the layers and/or between the separator and the layers. With preference, this embodiment comprises at least two separators per layer with cathode material.

The two separators are integrally connected to one another by way of a plurality of connecting locations such that they fix the layer with cathode material in place, that is to say such that no lateral movement of said layer is possible.

In a particular embodiment, the battery according to the invention comprises a first safety distance S between at least one wall of the housing and the at least one layer with anode material. In particular, the battery comprises a safety distance of less than 0.5 mm, in particular of less than 0.2 mm. In a further particular embodiment, the at least one layer with anode material is designed as positively engaging with at least one wall of the housing. This may be accomplished by, for example, the area of the at least one layer with anode material corresponding substantially to the inner cross section of the housing, so that the layer with anode material can be fitted exactly into the housing. This allows the distance between an inner wall of the housing and the layer with anode material to be less than 0.2 mm. In the case of a rectangular inner housing cross section, the layer with anode material may be in physical contact with up to three inner walls by way of its narrow edge. A fourth inner wall may be a little further away, in order to create sufficient space for discharge tabs. Alternatively, the sufficient space for discharge tabs may also be ensured by means of a bulge of the housing or by means of the form of the layers respectively with anode material or cathode material. A discharge tab clearance provided at the top or bottom, i.e. in parallel extension of the layers, would also be conceivable. Similarly, in the case of a round inner cross section of the housing, sufficient space for the discharge tabs could be provided by way of an attachment or by the inner geometry, while the layer with anode material would be located with positive engagement on the remaining inner wall of the housing. Such a design would allow further loss of capacity to be minimized and the battery would altogether be still more efficient.

In a particular embodiment, the battery comprises a second safety distance T between an outer edge, that is to say a narrow edge, of at least one layer with anode material and an outer edge, that is to say a narrow edge, of at least one layer with cathode material. This safety distance is less than 0.5 mm, in particular less than 0.3 mm, particular approximately 0.2 mm, while it can deviate by +/−25%.

In a particular embodiment, the separator, or two separators stacked one on top of the other, has/have in the region of the second safety distance T a plurality of welding points, which fix in place the at least one layer with cathode material which they surround. Consequently, slipping of the layer with cathode material is not possible and the safety of the battery is increased, that is to say a short-circuit cannot be caused by lateral displacement of the layer with cathode material.

In a particular embodiment, the housing is of mechanically stable material, in particular of nonconducting, mechanically stable plastic.

For the purposes of the present invention, mechanically stable material should be understood as meaning material that withstands a certain deformation pressure. For example, the material could be chosen such that it withstands a lateral displacement of layers with anode material, in particular prevents it entirely. In this example, a housing wall would have to be capable of withstanding a deformation or displacement pressure such that a side edge of a layer with anode material that is, for example, in bearing contact with an exact fit and positive engagement is not displaced. Thus, for example, a flexible plastic-coated metal foil would not be suitable. In an alternative embodiment, the housing comprises a material composite that comprises at least one mechanically stable material. What is decisive is that the inner side of the housing would have no, or negligible, conductivity, i.e. would be substantially a nonconductor. Therefore, a metallic housing with a lacquering or coating in the interior that lends the surface the properties of a nonconductor would be conceivable.

In a particular embodiment of the present invention, the at least one layer with anode material is arranged with its narrow outer edges positively engaging in the housing, apart from a discharge region; in particular, the at least one separating layer of the separator is of the same size as the at least one layer with anode material, that is to say the layer with anode material and the separator have substantially the same area extent, apart from said discharge region.

In a particularly preferred embodiment of the battery according to the invention, the at least one separator as a separating layer forms a discharge region at a defined region of the at least one layer with cathode material. This discharge region has an overhang which is greater than the remaining overhang of the separator, i.e. it protrudes in surface area further beyond the area of the cathode than the remaining overhang of the separator. This may be achieved, for example, by the area of the separator being partially extended in the discharge region. This may be more advantageous, in that it is possible to dispense with a further insulating sheet. As a result, for example, the space in the discharge region can be reduced.

In a particular embodiment, the at least one layer with anode material comprises an anode coated on a first metallic carrier band and the at least one layer with cathode material comprises a cathode coated on a second metallic carrier band. In this embodiment, the battery according to the invention further comprises at least one anode discharge tab and at least one cathode discharge tab, which are of the same material as the first metallic carrier band and/or the second metallic carrier band. By this construction, for example, secondary chemical reactions can be prevented.

In a particular embodiment, the housing is designed such that it closes off the interior space from the environment in a substantially gastight and watertight manner. Substantially gastight should be understood according to the invention as meaning that gas diffusion, in particular water vapor diffusion, does not take place, or is negligible.

In a particular embodiment, the battery is a lithium-ion battery.

A further aspect of the present invention concerns a method for producing the battery according to the invention. The method comprises the following steps:

a) providing a housing with a mechanically stable interior space, the housing being substantially of a material that has no, or negligible, electrical conductivity, preferably of a nonconductor, preferably of plastic;

b) fitting in at least one layer with anode material, this layer preferably being fitted in exactly, i.e. in such a way that a side edge of the anode material is in positive engagement with an inner wall of the housing;

c) fitting in a first separator as a separating layer;

d) placing on a layer with cathode material, which is smaller in surface area than the separator, and placing on that a further separator and subsequently integrally connecting, preferably welding, the further separator to the first separator at a plurality of locations that protrude in surface area beyond the layer with cathode material. Steps b) to d) may be repeated, if required, until the desired number of electrodes are in the housing, and the housing may subsequently be closed, preferably closed in a gastight manner.

In a particular embodiment, the integral connecting, preferably welding, comprises ultrasonic welding, laser welding, plasma welding and/or thermal welding.

In a particular embodiment, the closing, preferably gastight closing, comprises welding.

A further aspect of the present invention concerns a use of the battery according to the invention. The battery according to the invention is used for medical apparatuses, in particular as a battery for diagnostic devices and/or implantable pumps, in particular for operating an implantable pump.

All of the batteries according to the invention, the production method and the use of the same stated embodiments may of course be realized in any desired combination in the design of a battery according to the invention, of a method for producing it and/or of a use according to the invention unless they are expressly understood as alternatives or are mutually exclusive.

The present invention succeeds in providing batteries which, in spite of being of small forms, have a high energy density, a high degree of immunity to internal short-circuits and dendrite formation and can be used particularly efficiently, in particular in medical applications and apparatuses.

Further advantageous embodiments and combinations of features of the invention emerge from the following detailed description and the patent claims as a whole. The invention is explained in more detail below on the basis of figures and actual exemplary embodiments, without however being restricted by these.

BRIEF DESCRIPTION OF THE DRAWINGS

The drawings used for explaining the exemplary embodiment show.

Unless otherwise defined, in principle the same parts are provided with the same reference numerals in the figures.

Ways of Implementing the Invention

Figure 1:
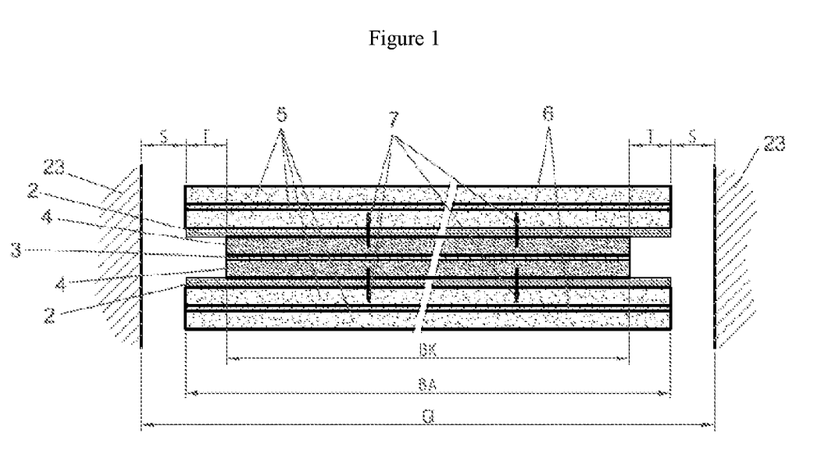
FIG. 1 schematically shows a cross section through a battery of the prior art.

In FIG. 1, a cross section through a battery of a stacked construction, as is known from the prior art, is schematically shown. The battery has a multiplicity of layers 2, 3, 4, 5, 6, 7 within a housing 23 of conducting metal. The layers 2, 3, 4, 5, 6, 7 are held in a sandwich construction. The battery comprises the following layers, from the inside outward: a metal foil, coated on both sides with active cathode material 4, for example lithium cobalt(III) oxide, of the cathode 3 forms the first electrode, from which the ion migration 7 to the active anode material 5, for example graphite, proceeds in the charging process. The active anode material 5 is on a coated metal foil of the anode 6. The two active electrodes, i.e. the layers with active cathode material 4 and the layers with active anode material 5, are separated from one another by a separator 2 of ion-conducting polyethylene (PE). Suitable materials are known to a person skilled in the art. In order to prevent an internal short-circuit, in practice a safety distance S of at least 0.5 mm is left between the outer edge of the layer with active anode material 5 and the inner wall of the housing 23. In other words, the width of the anode band BA is altogether at least 1 mm less than the inner housing width GI would allow. Similarly, a further safety distance T, of likewise at least 0.5 mm, must be maintained from the outer edge of the cathode to the outer edge of the anode for correct positioning and for the prevention of an internal short-circuit of the layer with the active cathode material 4 with respect to the outer edge of the layer with active anode material. Consequently, the width of the cathode band BK is altogether at least 1 mm less than the width of the anode band BA and in turn at least 2 mm less than the inner housing width GI would allow.

In extent, the width of the anode band BA consequently loses at least 0.5 mm with respect to the inner housing width GI and the width of the cathode band loses at least 0.5 mm with respect to the width of the anode band BA. This results in a loss of capacity. This is particularly serious in the case of forms of battery in which active electrode layers have a relatively great extent, such as for example horseshoe-shaped batteries or particularly small batteries.

Figure 2:
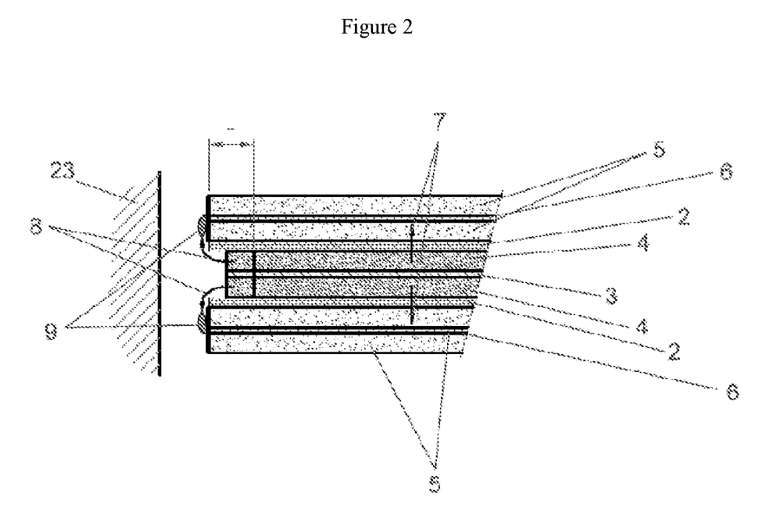
FIG. 2 schematically shows dendrite formation on a partial cross section.

In FIG. 2, the problem of dendrite formation 9 on a battery such as that described in FIG. 1 is shown. The sandwich-like construction has two layers with active cathode material 4 on a metal foil of the cathode 3 arranged in the middle. The two layers with active cathode material 4 are respectively kept physically separate from a layer with active anode material 5 in each case by means of a respective separator 2 as a separating layer. The layers with active anode material 5 are stacked on a metal foil of the anode. The ion migration during the charging process 7 takes place from the layers with active cathode material 4 to the layers with active anode material 5. The separator 2 is porous and electrically neutral and can be passed by the ions unhindered. During the charging process, however, an undesired ion migration 8 also takes place at the periphery of the layers with active cathode material 4 to the periphery of the layers with active anode material 5. This periphery is particularly susceptible to dentrite formation 8, for example starting from the metal foil of the anode 6. To prevent a lateral short-circuit during the charging process due to dendrite formation 8 between the anode and the metal foil of the cathode 3 or due to contact between the anode and the cathode (for example a displaced separator 2), a lateral safety distance is maintained around the cathode 3 coated with active material. This safety distance is made up of the required lateral distance S between the metallic cut edge of the cathode 3 and the active anode material 5 and the process-dependent tolerances and the displacement of the cathode and respective separators T1 and T2 that is possible during use.

Figure 3:
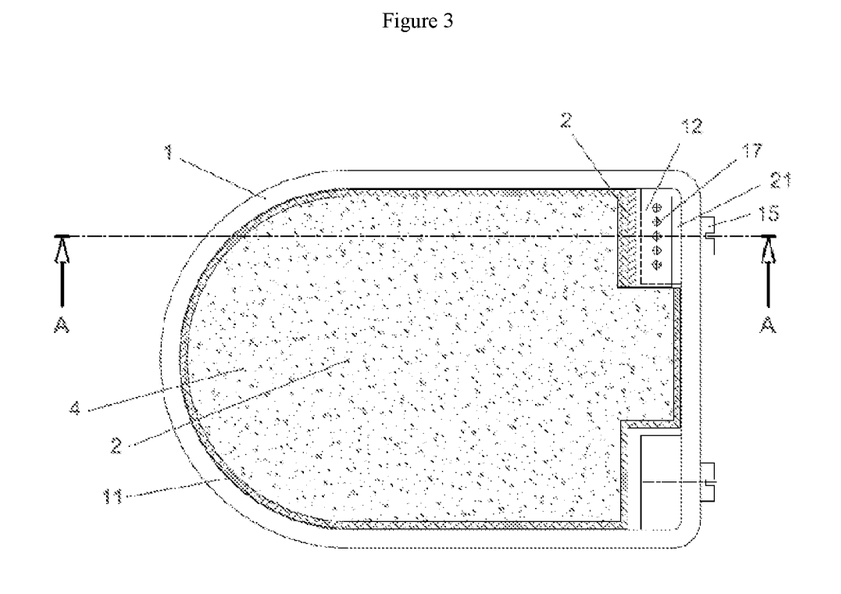
FIG. 3 schematically shows a sectional view of a battery according to the invention.

The schematic embodiment of the present invention that is shown in FIG. 3 shows a housing 1 of gastight, nonconducting plastic; the plastic LCP, for example, has proven to be suitable according to the invention, and this encloses an interior space that accommodates the electrode layers. The battery has a positive contact 15. The separator 2 protrudes in surface area beyond the active cathode material 4, so that an overhang forms. The overhang of the separator 2 is integrally connected to a separator 2 lying thereabove (not shown in the plan view of FIG. 3) at a plurality of locations by means of welding points 11. In the present exemplary embodiment, six such welding points 11 are shown. Depending on the form and design of the battery, some other number of welding points 11 may also be sufficient to position the layer with the active cathode material 4 precisely. In a part of the cathode that is not coated there is the welding zone 11 for the discharge tab. In the present FIG. 3, the welding points of the cathode, i.e. the +discharge tabs 17, are shown. In this example, the discharge tab of the cathode 21 consists of the same material as the metal foil 3 of the cathode (not shown in FIG. 3), that is to say of an aluminum compound.

Figure 4:
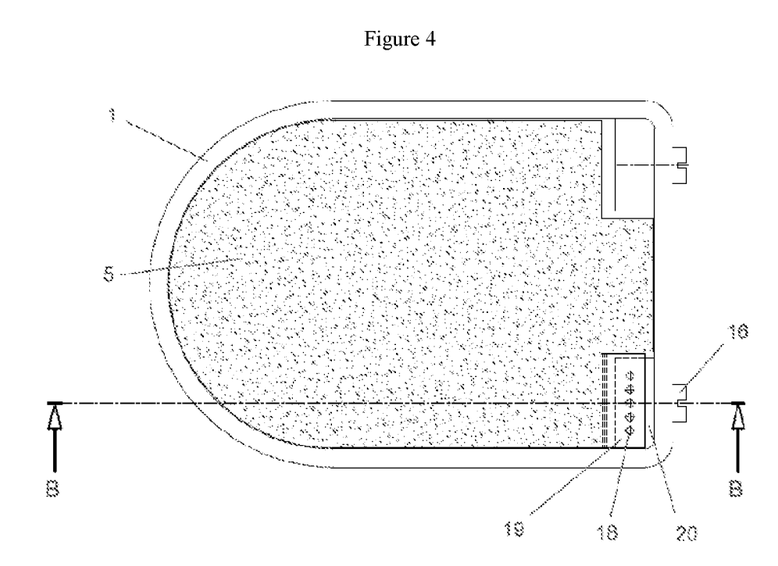
FIG. 4 schematically shows a further sectional view of a battery according to the invention.

In FIG. 4, figuratively speaking we go up or down a level in the sandwich construction in the exemplary embodiment of FIG. 3. A sectional plane is shown in plan view through a layer with active anode material 5. Likewise shown are the housing 1 and a negative contact 16. The negative contact 16 connects to the interior of the housing 1 with the noncoated part 19 of the anode. In this case, the discharge tab of the anode 20 has the same material as the metal foil of the anode 6. At the negative contact 16, within the housing 1, there are also the welding points of the anode, i.e. the—discharge tabs 18. The positive engagement of the layer with active anode material 5 with the inner wall of the housing 1 can be seen particularly well from FIG. 4. In this way, the available interior space is optimally used.

Figure 5:
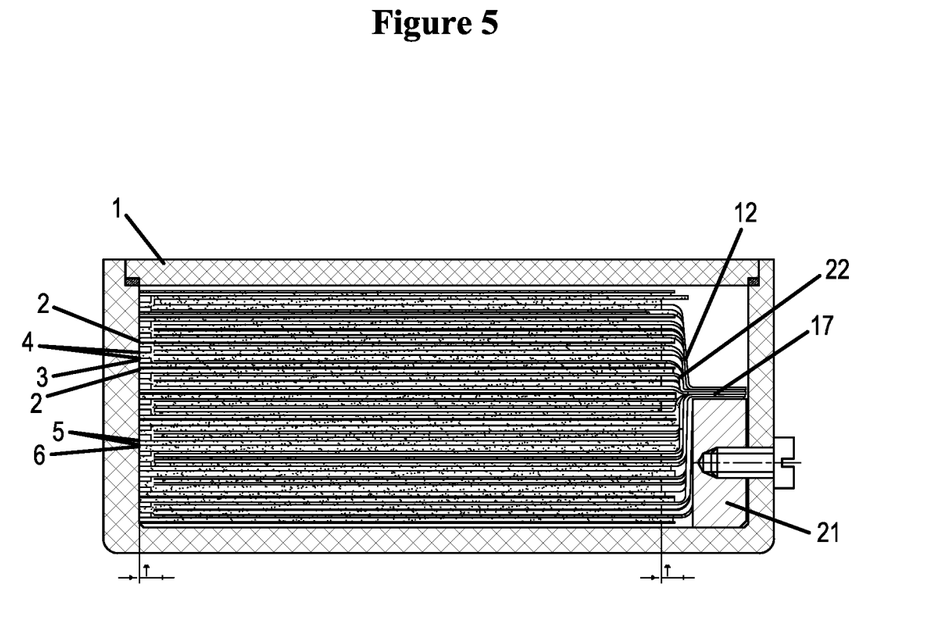
FIG. 5 schematically shows a cross section in the plane A-A of FIG. 3.

FIG. 5 illustrates the sandwich construction of a battery construction in stack form of an embodiment of the present invention. Moreover, FIG. 5 shows a cross section in the sectional plane A-A in the region of the cathode discharge tab 21 of FIG. 3. The battery comprises a multipart housing 1 comprising a receiving body, which defines an interior space in which the layers can be accommodated in a stacked construction, and a cover. The cover closes the battery from the outside atmosphere in a gastight manner, prevents the escape of electrolyte vapors and may be adhesively bonded, welded, clamped or fastened in some other way. The cover may be formed by any desired edge of the housing. The housing consists of a nonconducting, stable material, such as for example the liquid crystalline polymer. The layers comprise alternately active anode material 5 on a metal foil of the anode 6, separators 2 and, respectively in between, two layers with active cathode material 4 on a metal foil of the cathode 3. The separators are spot-welded (only indicated) and thus position and hold the cathode 3 and the layers with cathode material 4 in place. In FIG. 5, it can be seen well how the separators 2 in the discharge region (on the right) are extended. As a result, the separator acts in this region as an insulator 22. The welding zones for the discharge tab are concentrated in the noncoated part 12 and welded 17 to the discharge tab of the cathode 21. It can likewise be seen that the layer with the anode material 5 is at a distance of less than 0.5 mm from the inner wall of the housing 1. In the present case, the layer with the anode material 5 is of an exactly fitting design, so that the cut edge, or outer edge, of the layer with the anode material adjoins the inner wall of the housing 1 with positive engagement. This exactness of the fit allows the safety distance S to be reduced or omitted entirely. The safety distance T has likewise been reduced. This is made possible by the precise positioning of the layer with the cathode material 4. Subsequent displacement of the layer is likewise prevented by the provision of the plurality of welding points (not explicitly shown in FIG. 5).

Figure 6:
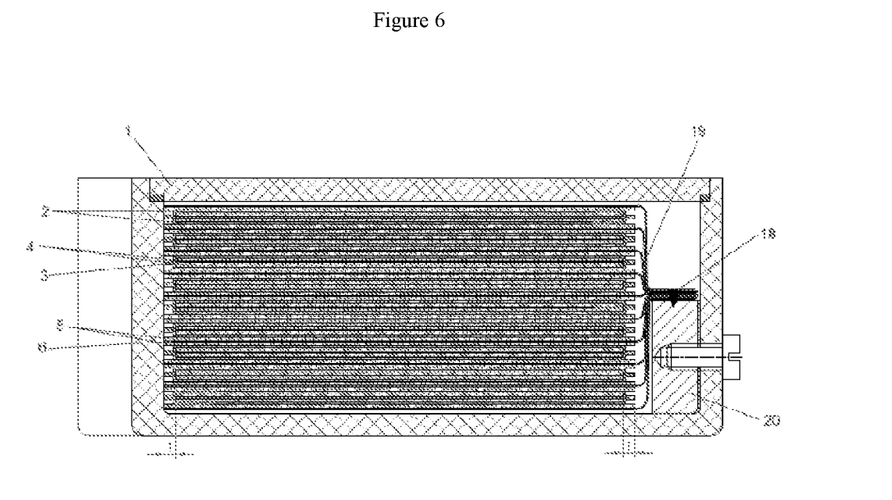
FIG. 6 schematically shows a cross section in the plane B-B of FIG. 4.

In FIG. 6, a battery construction in stack form of an embodiment of the present invention is illustrated. FIG. 6 also shows a cross section in the sectional plane B-B in the region of the anode discharge tab 20 of FIG. 4. By analogy with FIG. 5, the layers comprise alternately active anode material 5 on a metal foil of the anode 6, separators 2 and, respectively in between, two layers with active cathode material 4 on a metal foil of the cathode 3. The separators are spot-welded (only indicated) and thus position and hold the cathode 3 and the layers with cathode material 4 in place. Shown in FIG. 6 are the anode discharge tabs 19, which are concentrated and welded at the welding point 18 to the charge tab of the anode 20.

Figure 7:
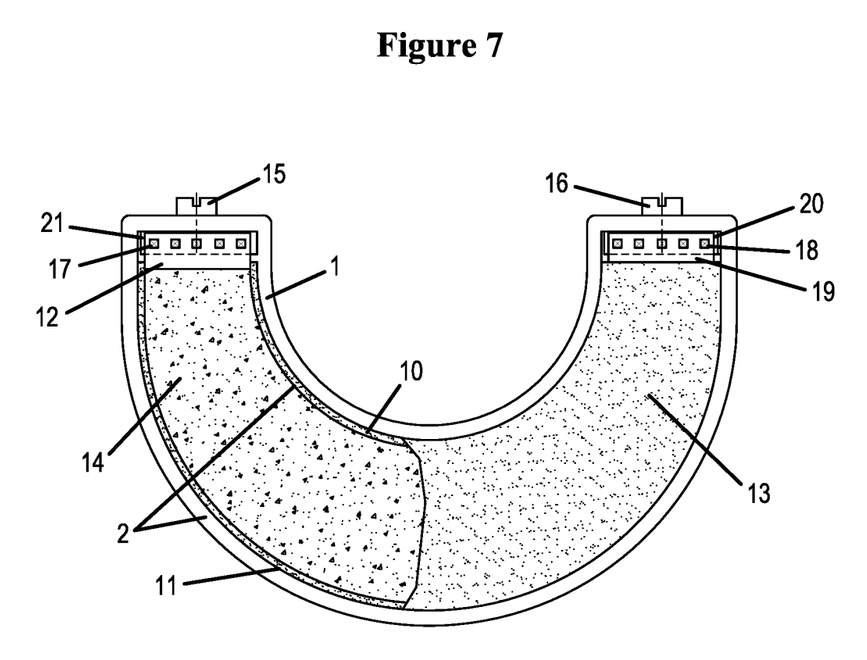
FIG. 7 schematically shows a battery according to the invention in a horseshoe-shaped embodiment that has been cut open.

FIG. 7 schematically shows a particular embodiment in which the battery has a horseshoe-shaped form. The representation is shown in plan view and cut open. A layer 13 has been partially omitted for better illustration.

The battery has a housing 1, which encloses an interior space in a horseshoe-shaped manner. The housing consists of a nonconducting plastic. The housing may be constructed in a multipart manner and snap-fitted, welded or adhesively bonded together. It is also possible to produce the housing from a composite in which a stable outer shell is lined with a nonconducting plastic.

The housing 1 encloses a series of electrodes of a stacked construction. In FIG. 7, the anode 13 and the cathode 14 are schematically shown. The cathode 14 is located between two separators 2, which protrude in surface area beyond the cathode 14, so that they form a separator overhang. At a plurality of welding points on the outer side 11 and welding points on the inner side 10, the two separators are welded. The noncoated part of the cathode 12 opens out into the discharge region 21. The discharge tabs 17 are concentrated and welded. In the discharge region of the cathode 21 there is also the positive contact 15 of the battery. The noncoated part of the anode 19 opens out into the anode discharge region 20. The anode discharge tabs 18 are concentrated and welded. In the discharge region of the anode 20 there is also the negative contact 16 of the battery.

A battery according to the invention may be used, for example, for supplying power to an implant, such as a medical pump. Alternatively, a hearing aid may also take a battery according to the invention. A battery according to the invention may also be used in the case of retinal implants. For example, as in the case of cochlear implants, the battery may be surgically fixed to the bone in the retroauricular region to power the implant.

Medical apparatuses that can be operated with a battery according to the invention are shown for example in U.S. Pat. No. 8,202,248 B2 (Burnett, R. D., et al.) or U.S. Pat. No. 7,909,790 B2 (Burnett, D. R.).

The invention claimed is:

1. A battery of a stacked construction, comprising:
   a) at least one layer with anode material;
   b) for each at least one layer with anode material, at least one layer with cathode material;
   c) between each at least one layer with anode material and at least one layer with cathode material, at least one separator as a separating layer, said at least one separator being of the same size as the at least one layer with anode material;
   d) a housing with an interior space, the housing surrounding the layers; whereby the housing consists substantially of a material that has no, or negligible, electrical conductivity;
   e) wherein the separator protrudes in surface area beyond the at least one layer with cathode material, so that the separator forms at least one overhang beyond at least one edge of the at least one layer with cathode material and the overhang of the separator is connected to a further overhang of the separator, or an overhang of a further separator, by way of a plurality of welding points such as to fix the layer of cathode material in place in order that no lateral movement of said cathode layer is possible; and
   f) wherein the at least one layer with anode material positively engages with at least one wall of the housing, the at least one layer of anode material having the same area extend as the at least one separator, apart from a discharge region.

2. The battery according to claim 1, wherein the at least one layer with anode material positively engages at least three walls of the housing.

3. The battery according to claim 1, wherein the at least one layer with anode material is arranged with its narrow outer edges positively engaging a housing, apart from a discharge region.

4. The battery according to claim 1, wherein an area of the at least one layer with anode material corresponds substantially to an inner cross-section of the housing, so that the at least one layer with anode material can be fitted exactly into the housing.

5. The battery according to claim 1, wherein the at least one separator has a clearance on one side, in order to allow a discharge tab to be led through from the at least one layer with cathode material.

6. The battery according to claim 1, wherein the at least one separator forms the discharge region at a defined region of the at least one layer with cathode material and this discharge region has a defined overhang of the at least one separator, said overhang protruding in surface area beyond the remaining overhang of the separator.

7. The battery according to claim 1, wherein the at least one layer with cathode material is smaller in surface area than the at least one separator.

8. The battery according to claim 1, wherein the at least one separator positively engages with at least one wall of the housing.

9. The battery according to claim 2, wherein the at least one separator positively engages at least three walls of the housing.

10. The battery according to claim 3, wherein the at least one separator is arranged with its narrow outer edges positively engaging the housing, apart from the discharge region.

11. The battery according to claim 4, wherein an area of the at least one separator corresponds substantially to an inner cross-section of the housing, so that the at least one separator can be fitted exactly into the housing.

12. The battery according to claim 1, wherein a first safety distance of less than 0.5 mm is provided between at least one wall of the housing and the at least one layer of anode material.

13. The battery according to claim 1, wherein a second safety distance of less than 0.5 mm between an outer edge of a layer of anode material and an outer edge of a layer of cathode material.

14. A battery of a stacked construction, comprising:
a) at least one layer with anode material;
b) for each at least one layer with anode material, at least one layer with cathode material;
c) between each at least one layer with anode material and at least one layer with cathode material, at least one separator as a separating layer, said at least one separator being of the same size as the at least one layer with anode material;
d) a housing with an interior space, the housing surrounding the layers; whereby the housing consists substantially of a material that has no, or negligible, electrical conductivity;
e) wherein the separator protrudes in surface area beyond the at least one layer with cathode material, so that the separator forms at least one overhang beyond at least one edge of the at least one layer with cathode material and the overhang of the separator is connected to a further overhang of the separator, or an overhang of a further separator, by way of a plurality of welding points such as to fix the layer of cathode material in place in order that no lateral movement of said cathode layer is possible and such that each layer with cathode material is enclosed by two separators connected to each other by way of the plurality of welding points; and
f) wherein the at least one layer with anode material positively engages with at least one wall of the housing, the at least one layer of anode material having the same area extend as the at least one separator, apart from a discharge region.

* * * * *